US012591553B2

(12) United States Patent
Sipani et al.

(10) Patent No.: US 12,591,553 B2
(45) Date of Patent: Mar. 31, 2026

(54) SCHEMA RELATIONSHIP DISCOVERY

(71) Applicant: Salesforce, Inc., San Francisco, CA (US)

(72) Inventors: Sourav Sipani, Bangalore (IN); Ajay Singh, Bangalore (IN)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/752,753

(22) Filed: Jun. 24, 2024

(65) Prior Publication Data

US 2025/0390473 A1    Dec. 25, 2025

(51) Int. Cl.
| | |
|---|---|
| *G06F 16/21* | (2019.01) |
| *G06F 16/25* | (2019.01) |
| *G06F 16/28* | (2019.01) |

(52) U.S. Cl.
CPC .......... G06F 16/212 (2019.01); G06F 16/258 (2019.01); G06F 16/288 (2019.01)

(58) Field of Classification Search
CPC ..... G06F 16/212; G06F 16/258; G06F 16/288
USPC ....................................................... 707/803
See application file for complete search history.

(56) References Cited

U.S. PATENT DOCUMENTS

| | | | | |
|---|---|---|---|---|
| 12,126,643 | B1* | 10/2024 | Skarphedinsson | ........................... H04L 63/1441 |
| 2021/0096932 | A1* | 4/2021 | Sayers | .................... G06F 9/542 |
| 2022/0293107 | A1* | 9/2022 | Leaman | .................. G10L 15/26 |
| 2022/0309037 | A1* | 9/2022 | Gutierrez | ................ G06F 16/16 |
| 2022/0368558 | A1* | 11/2022 | Ploegert | ............. G05B 13/0265 |
| 2024/0281410 | A1* | 8/2024 | Williams | .............. G06F 16/122 |
| 2024/0394281 | A1* | 11/2024 | Swanson | .............. G06F 16/248 |
| 2024/0403343 | A1* | 12/2024 | Ramanasankaran | ... G05B 15/02 |
| 2024/0427742 | A1* | 12/2024 | Guan | ..................... G06F 16/213 |
| 2025/0036773 | A1* | 1/2025 | Chihaia | ................... G06F 16/22 |

* cited by examiner

*Primary Examiner* — Giovanna B Colan
(74) *Attorney, Agent, or Firm* — Holland & Hart, LLP.

(57) ABSTRACT

Methods, systems, apparatuses, and computer program products are described. A system may obtain a set of metadata associated with multiple entities of a datastore, the multiple entities including at least two different data types. The system may augment, using a generative artificial intelligence (AI) model, the set of metadata resulting in a set of augmented metadata for the multiple entities of the datastore. The system may generate, using the set of augmented metadata, a set of entity objects for the multiple entities of the datastore and in accordance with a reference schema. The system may identify, using the generative AI model and the set of entity objects as inputs into the generative AI model, first relationships between two or more first entities of the multiple entities of the datastore. Based on the identified relationships and a reference schema relationship model, the system may generate a schema relationship model.

20 Claims, 8 Drawing Sheets

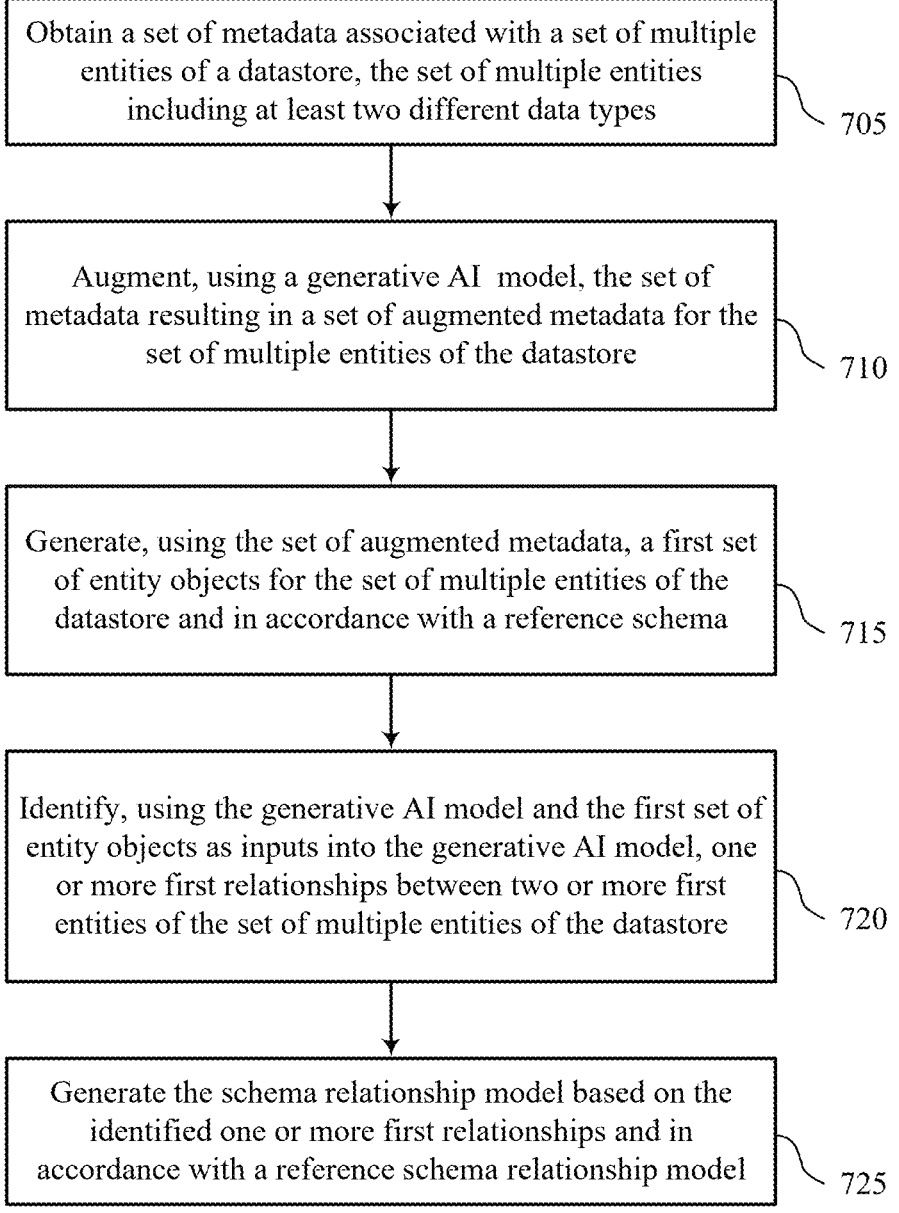

Obtain a set of metadata associated with a set of multiple
entities of a datastore, the set of multiple entities
including at least two different data types

705

Augment, using a generative AI model, the set of
metadata resulting in a set of augmented metadata for the
set of multiple entities of the datastore

710

Generate, using the set of augmented metadata, a first set
of entity objects for the set of multiple entities of the
datastore and in accordance with a reference schema

715

Identify, using the generative AI model and the first set of
entity objects as inputs into the generative AI model, one
or more first relationships between two or more first
entities of the set of multiple entities of the datastore

720

Generate the schema relationship model based on the
identified one or more first relationships and in
accordance with a reference schema relationship model

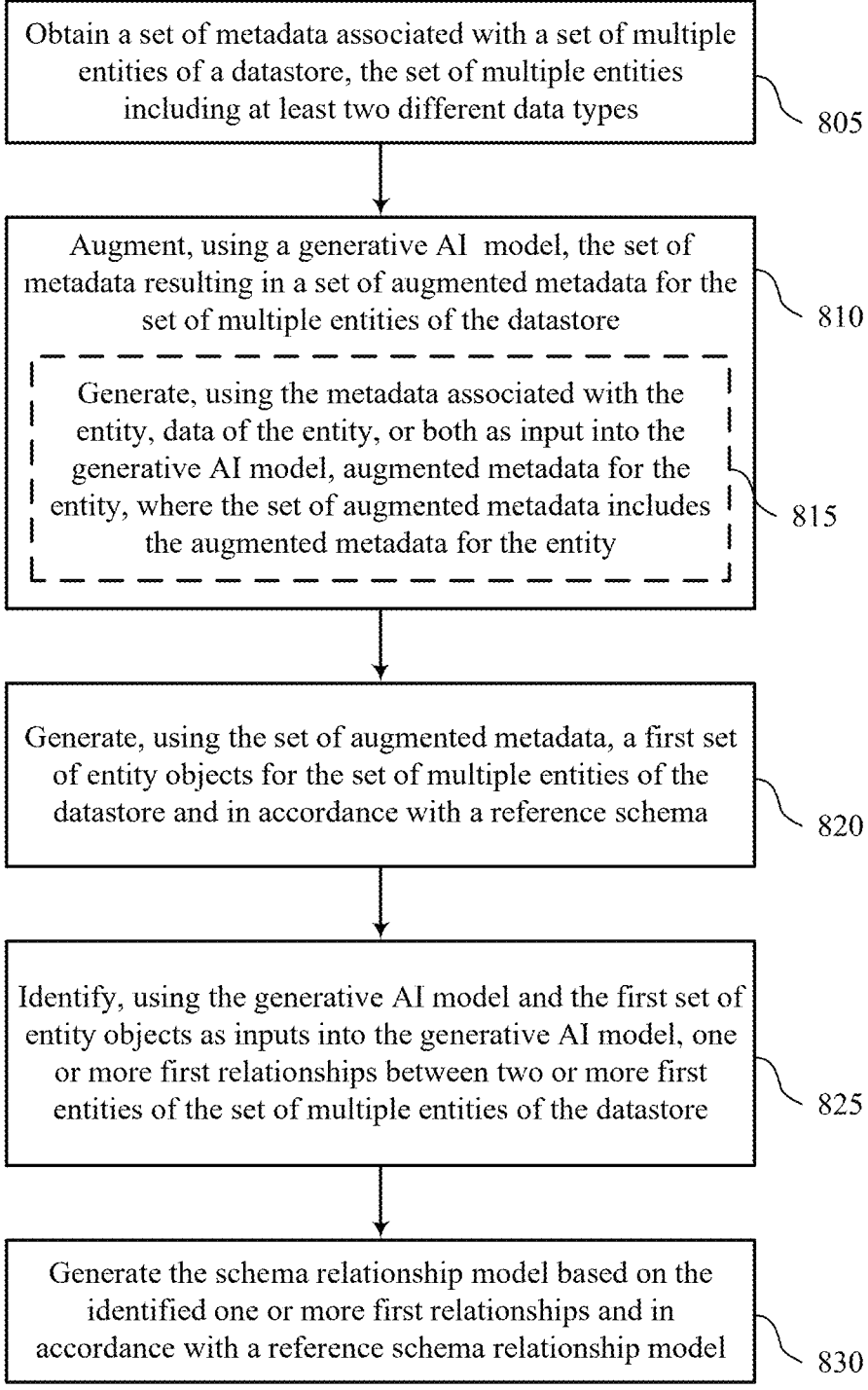

Obtain a set of metadata associated with a set of multiple
entities of a datastore, the set of multiple entities
including at least two different data types

805

Augment, using a generative AI model, the set of
metadata resulting in a set of augmented metadata for the
set of multiple entities of the datastore

810

Generate, using the metadata associated with the
entity, data of the entity, or both as input into the
generative AI model, augmented metadata for the
entity, where the set of augmented metadata includes
the augmented metadata for the entity

815

Generate, using the set of augmented metadata, a first set
of entity objects for the set of multiple entities of the
datastore and in accordance with a reference schema

820

Identify, using the generative AI model and the first set of
entity objects as inputs into the generative AI model, one
or more first relationships between two or more first
entities of the set of multiple entities of the datastore

825

Generate the schema relationship model based on the
identified one or more first relationships and in
accordance with a reference schema relationship model

SCHEMA RELATIONSHIP DISCOVERY

FIELD OF TECHNOLOGY

The present disclosure relates generally to database systems and data processing, and more specifically to schema relationship discovery.

BACKGROUND

A cloud platform (i.e., a computing platform for cloud computing) may be employed by multiple users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A cloud platform may support various types of databases and datastores for storing data accessible via various types of applications. In some cases, it may be beneficial to understand to understand various explicit or inherent relationships between entities stored in the databases or datastores.

BRIEF DESCRIPTION OF THE DRAWINGS

FIGS. 7 and 8 show flowcharts illustrating methods that support schema relationship discovery in accordance with aspects of the present disclosure.

DETAILED DESCRIPTION

Figure 1:
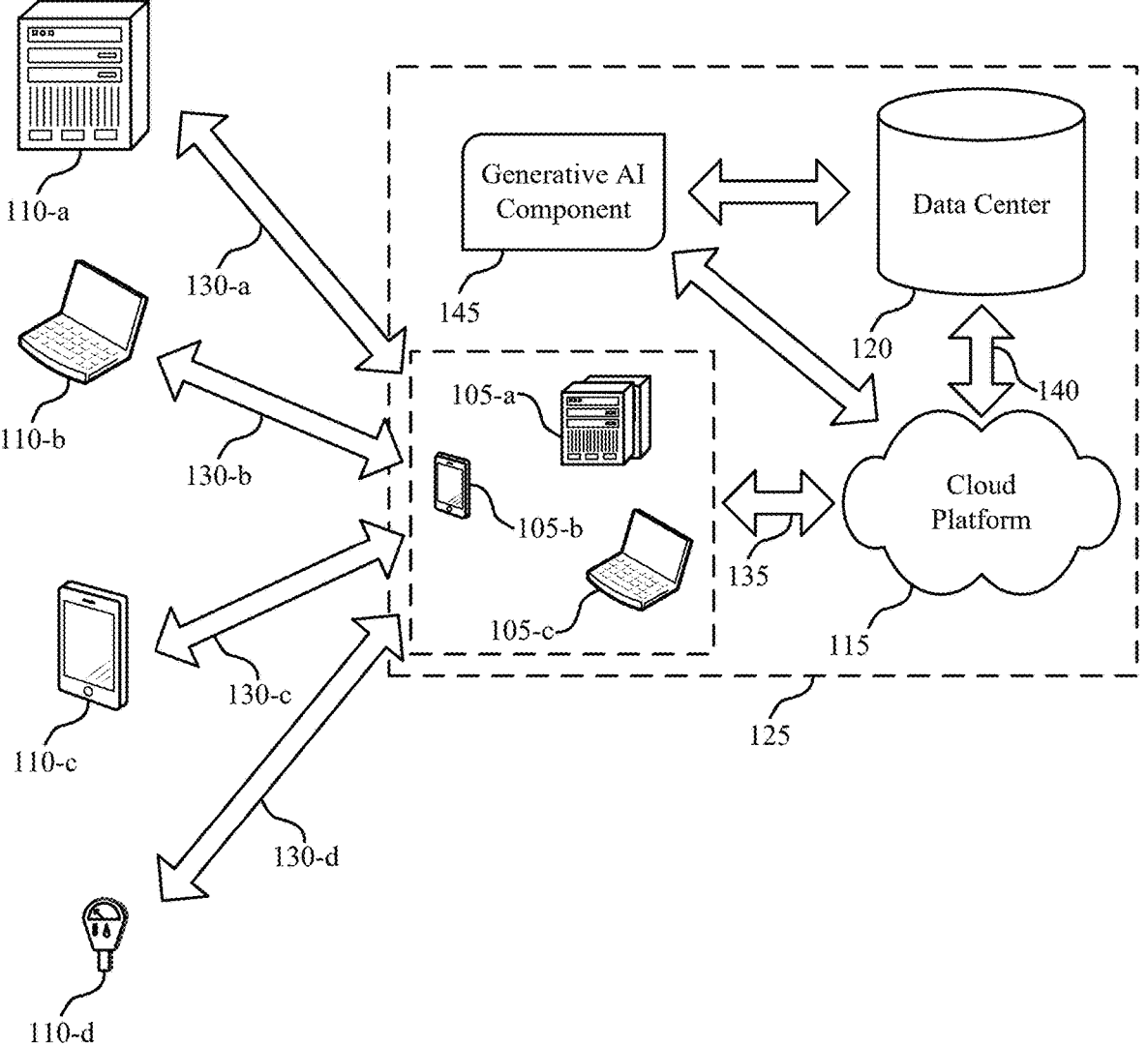
FIG. 1 illustrates an example of a generating a schema relationship model system that supports schema relationship discovery in accordance with aspects of the present disclosure.

In some cloud computing scenarios, a relational database model may identify relationships between entities, between databases, or both. For example, entities may include one or more fields which are configured to reference another entity. The one or more fields may be associated with a foreign key constraint or, in some cases, may be examples of summarization or formula fields. In the example of the foreign key constraint, the one or more fields may include a foreign key referring to a primary key in another entity. A foreign key constraint may allow data to be inserted to a parent table including the primary key but not a child table including the foreign key for the one or more fields referencing the parent table in the child table. In the example of the summarization or formula fields, the one or more fields may include or identify a relationship between a first entity and a second entity. For example, the summarization or formula field may identify a relationship between the first entity and the second entity, and, in some cases, a relationship type, such as a parent-child or master-detail relationship, a many-to-many relationship, a lookup relationship, a hierarchical relationship, or the like.

However, the relational database model including the foreign key constraints, the summarization or formula fields, or both may not identify relationships between some entities with inherent relationships as the one or more fields may be configured manually. That is, the relational model based on fields within entities referencing other entities may rely on manual identification of relationships and manual configuration of references to the relationships. In some cases, the relational database model may be relevant to structured query language (SQL) databases running on a same instance. For example, the relational database model may not support SQL databases on different instances, databases having a data type different than SQL, or both. Additionally, the relational database model may not support relationships between disparate data sources. For example, the relational database model may not support relationship identification across different data types, such as between SQL, not only SQL (NoSQL) data, document-based data, or the like. As an example, the relational database model may not support inclusion of one or more fields in an SQL entity referencing a NoSQL entity. In such cases, the relationships across different data types may not be identifiable via the one or more fields, and users referencing the different entities may not be able to locate information without prior knowledge of relationships across the different data types.

As described herein, a system may identify relationships between different entities via a generative artificial intelligence (AI) model. To identify the relationships, the system may transform metadata associated with different entities of a datastore to a common format, such as an entity object. That is, the system may generate entity objects for the entities of the datastore based on metadata of respective entities. Transforming the metadata associated with the different entities to the common format may enable the system to identify relationships between entities of different data types. The system may identify the relationships via the generative AI model based on the entity objects. For example, the generative AI model may produce, as an output, the relationships based on receiving the entity objects as an input. The system may generate a schema relationship model of the relationships based on the relationships identified by the generative AI model. For example, the schema relationship model may include relationships identified previously or manually, and the system may update the schema relationship model with the identified relationships (e.g., inherent relationships) from the generative AI model.

Identification of inherent and other relationships using the techniques described herein may be advantageous over other systems in various ways. For example, by formatting the entity metadata and augmented metadata to a common format (e.g., a JSON object), the data may be input into or provided to one or more LLMs that may be able to efficiently identify relationships between entities using the data formatted in the common format. That is, without the common format, the LLMs may not be able to identify which fields or data to use to identify relationships, which may result in incorrect, inaccurate, or missed relationships. Further, identification of relationships between entities of multiple data types and from various different datastores (e.g., data center 120) may provide a complete picture of tenant data of a tenant, which may support applications with enhanced functionality. That is, a developer that is developing an application based on tenant data may be able to access, by using the relationship model, multiple different databases and data types to support the enhanced functionality.

In some examples, prior to generating the entity objects, the system may augment the metadata. For example, the system may augment the metadata via a large language model (LLM). That is, the LLM may fill in empty fields, add additional detail to existing fields, or both for the entities. In some examples, the generative AI model may identify one or more fields which are lacking information, and the LLM may augment the identified one or more fields accordingly. Additionally, or alternatively, the LLM may augment one or more fields used to identify relationships, such as used by the generative AI model or by a manual relationship model to identify relationships (e.g., a foreign key field, a summarization field, a formula field, etc.).

In some examples, the system may generate the entity objects, generate the schema relationship model, or both based on a reference schema (e.g., an entity object template). For example, the system may input the augmented metadata and a reference schema to the generative AI model to generate the entity objects. The reference schema may be an entity object including one or more empty fields. Additionally, or alternatively, the system may input the entity objects and a reference schema relationship model to the generative AI model to identify the relationships and generate the schema relationship model.

Aspects of the disclosure are initially described in the context of an environment supporting an on-demand database service. Aspects of the disclosure are also described in the context of a system and a process flow. Aspects of the disclosure are further illustrated by and described with reference to apparatus diagrams, system diagrams, and flowcharts that relate to schema relationship discovery.

FIG. 1 illustrates an example of a system 100 for cloud computing that supports schema relationship discovery in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The system 100 may be an example of a multi-tenant system. For example, the system 100 may store data and provide applications, solutions, or any other functionality for multiple tenants concurrently. A tenant may be an example of a group of users (e.g., an organization) associated with a same tenant identifier (ID) who share access, privileges, or both for the system 100. The system 100 may effectively separate data and processes for a first tenant from data and processes for other tenants using a system architecture, logic, or both that support secure multi-tenancy. In some examples, the system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the system 100 may run a single instance of software on a processing device (e.g., a server, server cluster, virtual machine) to serve multiple tenants. Such a multi-tenant system may provide for efficient integrations (e.g., using application programming interfaces (APIs)) by applying the integrations to the same software application and underlying architectures supporting multiple tenants. In some cases, processing resources, memory resources, or both may be shared by multiple tenants.

As described herein, the system 100 may support any configuration for providing multi-tenant functionality. For example, the system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The system 100 may support scaling of tenants within the multi-tenant system, for example, using scale triggers, automatic scaling procedures, scaling requests, or any combination thereof. In some cases, the system 100 may implement one or more scaling rules to enable relatively fair sharing of resources across tenants. For example, a tenant may have a threshold quantity of processing resources, memory resources, or both to use, which in some cases may be tied to a subscription by the tenant.

The system 100 may support schema relationship discovery. To support such techniques, the system 100 may include a generative AI component 145. The generative AI component 145 may be an example or a component of an LLM, such as a generative AI model. In some examples, the generative AI component 145 may additionally, or alternatively, be referred to as any of an AI, a generative AI (GAI), a GAI model, an LLM, a machine learning model, or any similar terminology. The system 100 may support any configuration for the use of generative AI models. In FIG. 1, the generative AI component 145 is depicted as being located external to the subsystem 125. However, the generative AI component 145 may be hosted on the cloud platform 115, elsewhere within the subsystem 125, or outside the subsystem 125 (e.g., a publicly-hosted platform). Additionally, or alternatively, multiple generative AI components 145 may be employed to perform one or more of the actions described as being performed by a single generative AI component 145. Further, in some examples, the generative AI component 145 may communicate with one or more other elements, such as a contact 110, the data center 120, one or more other elements, or any combination thereof, to receive additional information (e.g., that may be indicated in the query or the prompt) that is to be considered for performing generative processes.

Some other systems may not identify relationships between entities as one or more fields configured to reference relationships between entities may be configured manually. For example, some other systems may generate a relational database model based on fields within entities referencing other entities, which rely on manual identification of relationships and manual configuration of references to the relationships. As an example, some other systems may use a foreign key constraint or summarization or formula fields to record relationships between different entities. In the example of the foreign key constraint, the one or more fields may include a foreign key referring to a primary key in another entity. In the example of the summarization or formula fields, the one or more fields may identify a relationship between the first entity and the second entity, and, in some cases, a relationship type, such as a parent-child or master-detail relationship, a many-to-many relationship, a lookup relationship, a hierarchical relationship, or the like. In some cases, the other systems may generate a relational database model based on SQL databases running on a same instance. For example, the other systems may not support a relational model including relationships between SQL databases on different instances, databases having a data type different than SQL, or both. Additionally, the other systems may not support relationships between disparate data sources. For example, the other systems may not support relationship identification across different data types, such as between SQL, NoSQL data, document-based data, or the like. As an example, the other systems may not support inclusion of one or more fields in an SQL entity referencing a NoSQL entity. In such cases, the relationships across different data types may not be identifiable via the one or more fields, and users referencing the different entities may not be able to locate information without prior knowledge of relationships across the different data types.

In contrast, the system 100 may support identification of relationships between entities of different data types. For example, the system 100 may generate entity objects corresponding to the entities based on metadata of each entity. In other words, the system 100 may generate entities having a same or common format. The system 100 may identify relationships based on the entity objects via the generative AI component 145. By identifying the relationships based on the entity objects, the system 100 may support relationship identification across entities of different data types. Additionally, or alternatively, the system 100 may support more accurate identification of relationships relative to other systems. For example, the system 100 may augment metadata of entities via the generative AI component 145, where the entity objects are generated and the relationships are identified according to the augmented metadata. By augmenting the data prior to identifying the relationships, the system 100 may identify relationships that may not be identified via manual review of different entities.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
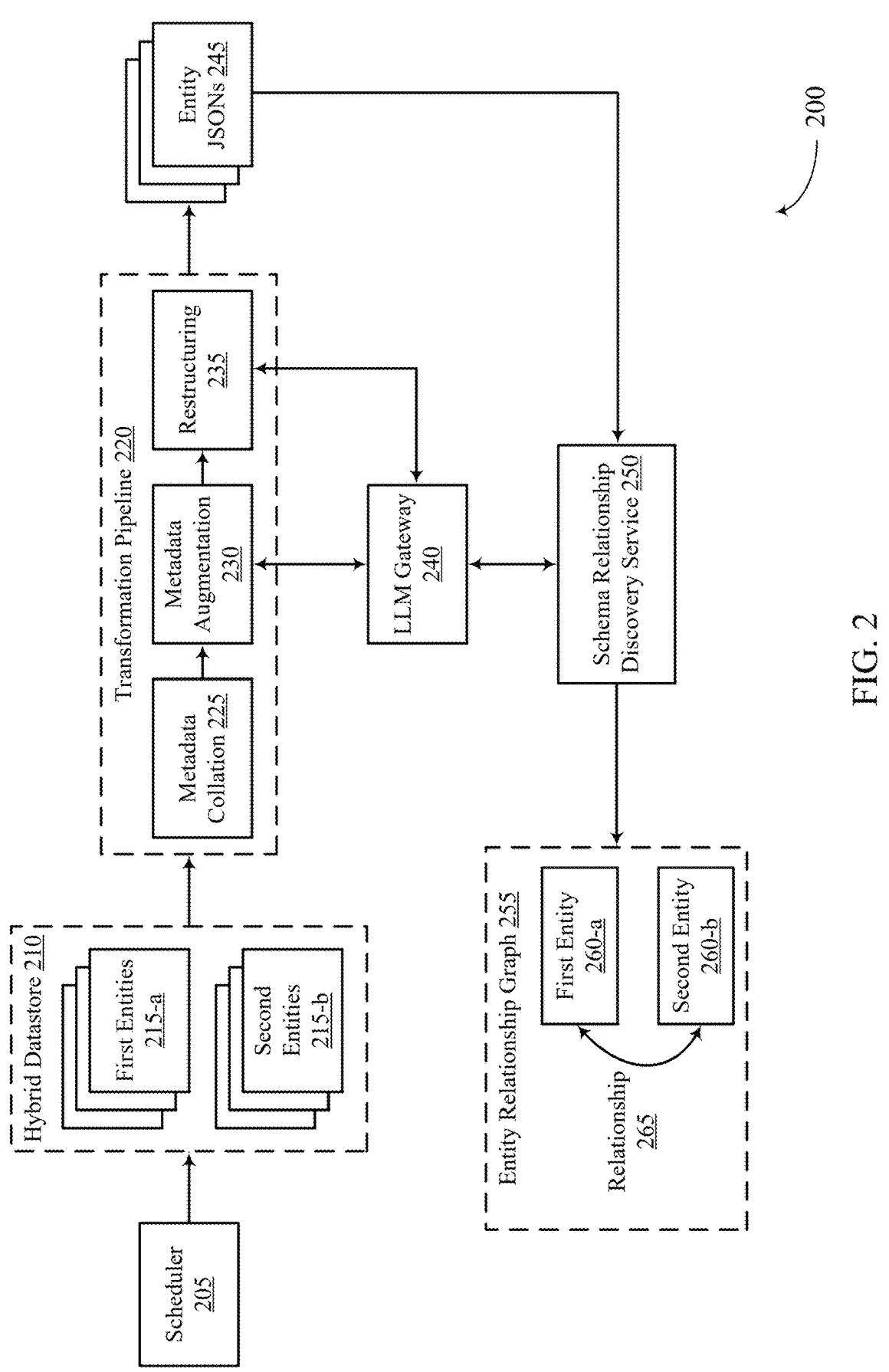
FIG. 2 shows an example of a system that supports schema relationship discovery in accordance with aspects of the present disclosure.

FIG. 2 shows an example of a system 200 that supports schema relationship discovery in accordance with aspects of the present disclosure. The system 200 may implement or be implemented by one or more devices or systems as described with reference to FIG. 1. In some examples, the system 200 may include a hybrid datastore 210, which may be an example of or a component of the data center 120 as described with reference to FIG. 2. Additionally, or alternatively, the system 200 may include a LLM gateway 240, which may be an example of the generative AI component 145 as described with reference to FIG. 1.

In the example of FIG. 2, the system 200 may generate a schema relationship model using one or more generative AI components. For example, the system 200 may generate a schema relationship model, such as an entity relationship graph 255, via the one or more generative AI components, including a LLM gateway 240 and a schema relationship discovery service 250. To generate the entity relationship graph 255, the system 200 may provide, as inputs to the one or more generative AI components, metadata. For example, the system 200 may include the hybrid datastore 210 including multiple entities of at least two different data types. That is, the hybrid datastore 210 may include first entities 215-*a* of a first data type and second entities 215-*b* of a second data type. The data types may be SQL, NoSQL, documents, binary large objects (BLOBs), files, or the like. Each entity in the hybrid datastore 210 may be an example of a data object, a data table, a NoSQL object, a document, a BLOB, or another type of object. Additionally, the hybrid datastore 210 may represent one or more different (e.g., geographically or logically separated) datastores that are accessed via one or more different interfaces. Additionally, or alternatively, data of different data types in the hybrid datastore 210 may be accessed via common interface. The multiple entities of the hybrid datastore 210 may be associated with respective metadata. The metadata for respective entities may include a description of the entity, one or more field descriptions, relationships with other entities (e.g., included in one or more fields), or the like. The system 200 may provide the metadata of the hybrid datastore 210, such as metadata of respective entities of the hybrid datastore 210, to the transformation pipeline 220.

The transformation pipeline 220 of the system 200 may transform respective entities to entity JSONs 245 (e.g., JSON objects). For example, the transformation pipeline 220 may generate respective entity objects (e.g., entity JSONs 245) corresponding to entities of the hybrid datastore 210. In other words, the system 200 may, via the transformation pipeline 220, generate a first entity JSON corresponding to a first entity of the hybrid datastore 210, a second entity JSON corresponding to a second entity of the hybrid datastore 210, and so on. The system 200 may generate the entity JSONs 245 to identify relationships between different entities according to a common format. That is, because the hybrid datastore 210 includes entities of the different data types, the system 200 may transform the entities to a common format prior to identifying relationships between entities.

The transformation pipeline 220 may include metadata collation 225. For example, the metadata collation 225 may include obtaining metadata from the hybrid datastore 210. In other words, metadata collation 225 includes gathering the metadata for each entity of the hybrid datastore 210, including one or more details such as field descriptions and existing associations or relationships between entities.

After the metadata collation 225, the transformation pipeline 220 may include metadata augmentation 230. The metadata augmentation 230 may include augmenting the collated metadata. In some examples, the system 200 may augment the metadata via one or more generative AI components, such as via the LLM gateway 240. Augmenting the metadata may include adding description to entities (e.g., to empty fields), supplementing existing information, or both. For example, the metadata augmentation 230 may include elaborating on the descriptions of the entities and fields of the entities. In some examples, the metadata augmentation 230 may add description to one or more fields that lack relationships (e.g., clear relationships) with other entities. For example, the metadata obtained from an entity (e.g., a data table) in the hybrid datastore 210 may be provided to the LLM gateway 240 with instructions (e.g., prompts) to augment or expand upon the metadata. In some examples, the data within the entity (e.g., row or columns) may be provided to the LLM gateway 240 to support metadata augmentation.

The LLM gateway 240 may be an example of an interface that is used to access one or more LLMs. The LLMs may be external provided LLMs or internally configured or generated LLMs. The LLMs may be configured to receive the metadata for the entity, the data of the entity, or both, and provide additional context or description of various aspects of the entity including missing or incomplete field or column descriptions, expanded entity description (e.g., table description), relationships between fields, etc. The data generated by the LLMs, in addition to the original metadata, may be augmented metadata.

The transformation pipeline 220 may include restructuring 235. For example, the system 200 may restructure the augmented metadata. The restructuring 235 may result in entity objects corresponding to the entities of the hybrid datastore 210, such as entity JSONs 245. For example, the restructuring 235 may include generating the entity JSONs 245 based on the augmented metadata. In some examples, to generate the entity JSONs 245, the system 200 may use the LLM gateway 240. For example, the system 200 may provide an input to the LLM gateway 240 including the augmented metadata and a reference schema. The reference schema may be an example of a JSON including empty fields (e.g., a JSON template). In some examples, by providing the reference schema in the input, the system 200 may prevent a hallucination of the LLM gateway 240. The LLM gateway 240, the transformation pipeline 220, or both may generate, as an output, the entity JSONs 245. The entity JSONs 245 may have a same format as the reference schema. That is, the output of the LLM gateway 240 may be in accordance with the reference schema.

In some examples, the operations described with reference to FIG. 2 prior to identifying the relationships by the schema relationship discovery service 250 may be referred to as preprocessing. For example, the system 200 may prepare data of the hybrid datastore 210 for analysis by the schema relationship discovery service 250, including transforming metadata of the hybrid datastore 210 (e.g., information about data of entities of the hybrid datastore), with the augmented metadata, into a JSON format.

The system 200 may provide the entity JSONs 245 to the schema relationship discovery service 250. For example, the schema relationship discovery service 250 may identify relationships between the entity JSONs 245. As an example, the entity JSONs 245 may include a first entity JSON corresponding to a first entity 260-*a* of the hybrid datastore 210 and a second entity JSON corresponding to a second entity 260-*b* of the hybrid datastore 210. The schema relationship discovery service 250 may identify a relationship 265 (e.g., if applicable) between the first entity 260-*a* and the second entity 260-*b*. In some examples, the schema relationship discovery service 250 may identify the relationship 265 using the LLM gateway 240. For example, the schema relationship discovery service 250 may provide, as input to the LLM gateway 240, the entity JSONs 245 and a reference schema relationship model, such as a reference entity relationship graph.

The LLM gateway 240 may identify (e.g., using the accessible LLMs) the relationship 265 and provide, as an output, the entity relationship graph 255 or an identification of the relationships between entities that may be used to generate the entity relationship graph 255. The entity relationship graph 255 may indicate which entities have relationships, relationship types between entities, or both. For example, the relationship 265 may be a duplicate, subset, superset, intersection, transformation, combination, or the like. In examples in which the relationship 265 is a duplicate, the first entity 260-*a* and the second entity 260-*b* may include the same information. In examples in which the relationship 265 is a subset, the first entity 260-*a* may include a portion of information of the second entity 260-*b* (e.g., the first entity 260-*a* may be a subset of the second entity 260-*b*). In examples in which the relationship 265 is a superset, the first entity 260-*a* may include the information of the second entity 260-*b* and additional information (e.g., the first entity 260-*a* may be a superset of the second entity 260-*b*). In examples in which the relationship 265 is an intersection, the first entity 260-*a* and the second entity 260-*b* may include some same information and some different information. In examples in which the relationship 265 is a transformation, the first entity 260-*a* may include information derived by transforming one or more fields in the second entity 260-*b*. In examples in which the relationship 265 is a combination, the first entity 260-*a* may include information of the second entity 260-*b* and another entity (e.g., a third entity).

In some examples, the first entity 260-*a*, the second entity 260-*b*, or both may be examples of groups of entities. For example, the first entity 260-*a*, the second entity 260-*b*, or both may include two or more entities having identified relationships (e.g., explicit relationships, relationships identified via one or more fields, etc.). That is, the relationship 265 may be a relationship between a first group of entities and a second group of entities.

The system 200 may identify relationships between entities of the hybrid datastore 210 and update the entity relationship graph 255 periodically. For example, the relationship identification described herein may be a recursive or iterative process. In some examples, the system 200 may initiate the relationship identification, the update to the entity relationship graph 255, or both periodically. For example, a scheduler 205 of the system 200 may initiate relationship identification, updates to the entity relationship graph 255, or both at a predefined interval (e.g., in time). In some examples, the scheduler 205 may initiate the update periodically in accordance with a cron job. Additionally, or alternatively, the system 200 may initiate the update based on the hybrid datastore 210 including a new entity. For example, if the hybrid datastore 210 is updated to include the new entity, the system 200 may perform one or more operations of the transformation pipeline 220 to the new entity and identify relationships between the new entity according to an entity JSON of the new entity and the entity relationship graph 255 (e.g., from a previous iteration). That is, the system 200 may identify relationships between the new entity and the first entity 260-*a*, the second entity 260-*b*, or both.

Figure 3:
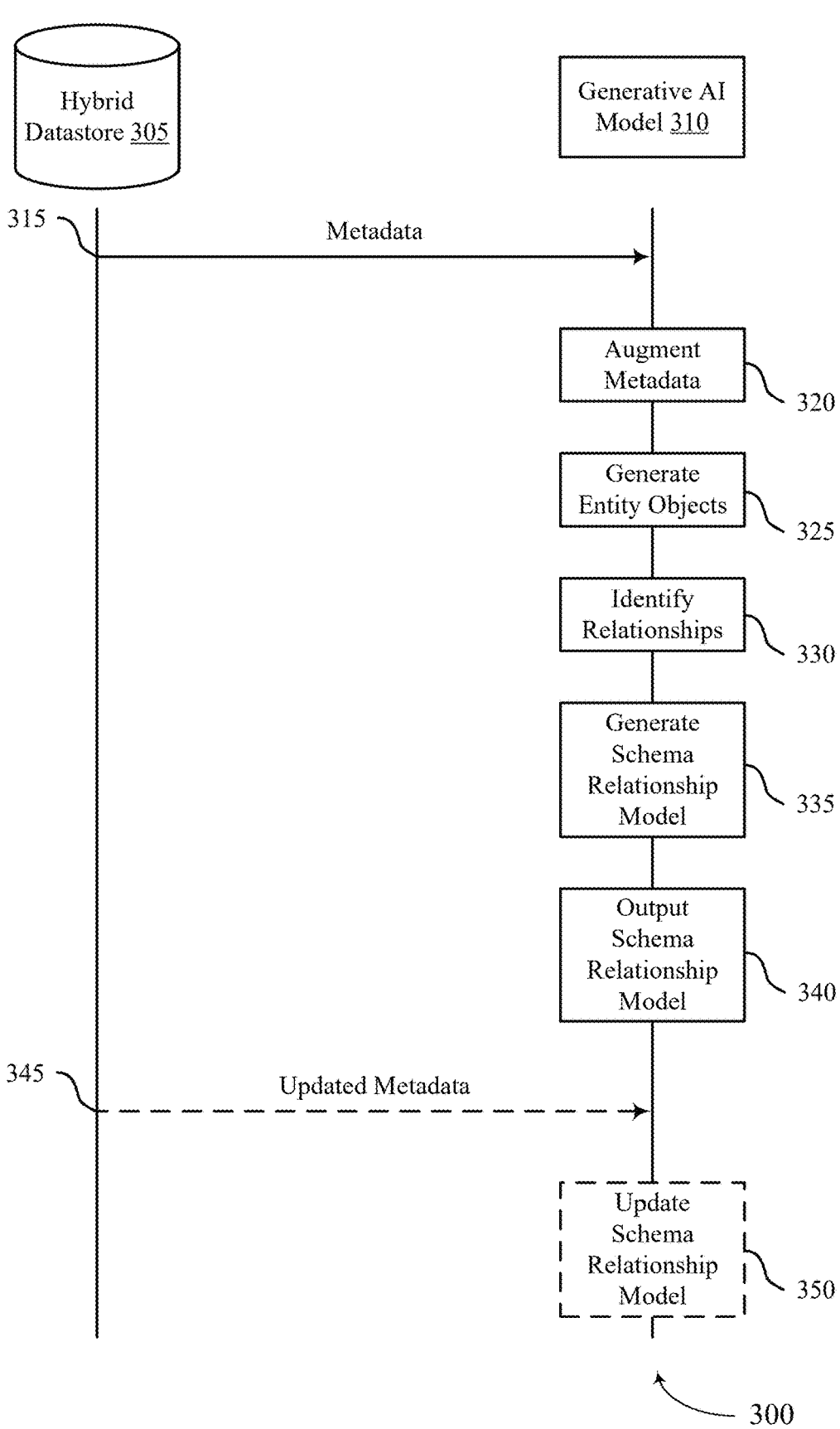
FIG. 3 shows an example of a process flow that supports schema relationship discovery in accordance with aspects of the present disclosure.

FIG. 3 shows an example of a process flow 300 that supports schema relationship discovery in accordance with aspects of the present disclosure. The process flow 300 may be implemented by a system including a hybrid datastore 305 and a generative AI model 310. The hybrid datastore 305 and the generative AI model 310 may be examples of corresponding devices or systems as described with reference to FIGS. 1 and 2. For example, the hybrid datastore 305 may be an example of the hybrid datastore 210 as described with reference to FIG. 2. Additionally, or alternatively, the generative AI model 310 may be an example of or include the generative AI component 145 as described with reference to FIG. 1 or the LLM gateway 240 as described with reference to FIG. 2.

Alternative examples of the following may be implemented, where some operations are performed in a different order than described or are not performed at all. In some cases, operations may include additional features not mentioned below, or further operations may be added. Although the hybrid datastore 305 and the generative AI model 310 are shown performing the operations of the process flow 300, some aspects of some operations may also be performed by one or more other components.

At 315, the generative AI model 310 may obtain metadata. For example, the generative AI model 310 may obtain a set of metadata associated with multiple entities of the hybrid datastore 305. The multiple entities of the hybrid datastore 305 may include at least two different data types. The multiple entities including the at least two different data types may include one or more SQL entities, one or more NoSQL entities, one or more documents, one or more BLOBs, one or more files, or any combination thereof. The multiple entities may be examples of the first entities 215-*a* or the second entities 215-*b* as described with reference to FIG. 2. In some examples, metadata of the set of metadata for an entity of the multiple entities may include a table description of the entity, one or more field identifiers of the entity, one or more column identifiers of the entity, or any combination thereof. Additionally, or alternatively, the hybrid datastore 305 may include multiple different data types.

At 320, the generative AI model 310 may augment the metadata. For example, the generative AI model 310 may augment the set of metadata resulting in a set of augmented metadata for the multiple entities of the datastore. Augmenting the metadata may be an example of the metadata augmentation 230 as described with reference to FIG. 2. In some examples, generating augmented metadata for an entity of the multiple entities may be based on metadata associated with the entity, data of the entity, or both. For example, the generative AI model 310 may output the augmented metadata using the metadata associated with the entity, data of the entity, or both as inputs to the generative AI model 310. Additionally, or alternatively, generating the augmented data for the entity may include generating information for one or more field descriptors, field identifiers, table descriptions, entity descriptions, or any combination thereof. For example, generating augmented metadata may include adding new fields or adding additional information to existing fields. In some examples, the generative AI model 310 may augment the metadata via a LLM. For example, the generative AI model 310 may be an example of or include an LLM. The LLM may be an example of the LLM gateway 240 as described with reference to FIG. 2.

At 325, the generative AI model 310 may generate entity objects. For example, the generative AI model 310 may generate, using the set of augmented metadata, a first set of entity objects for the multiple entities of the hybrid datastore 305 and in accordance with a reference schema. The first set of entity objects may be an example of the entity JSONs 245 as described with reference to FIG. 2. In other words, generating the entity objects may include generating a respective JSON object for each entity of the multiple entities using the reference schema that is an empty JSON structure.

At 330, the generative AI model 310 may identify relationships. For example, the generative AI model 310 may identify one or more first relationships between two or more first entities of the multiple entities of the hybrid datastore 305 using the first set of entity objects as input. The one or more first relationships may be an example of the relationship 265 as described with reference to FIG. 2. In some examples, the generative AI model 310 may identify the one or more first relationships based on one or more second relationships between two or more second entities of the multiple entities of the hybrid datastore 305. For example, the generative AI model 310 may output the one or more first relationships based on an input of the one or more second relationships, where the one or more second relationships are identified prior to the one or more first relationships. As an example, the one or more second relationships may be manually identified or identified via the generative AI model 310 previously. In some examples, the one or more first relationships may include a relationship between a first entity of a first data type and a second entity of a second data type (e.g., a relationship between a SQL data table and a file).

At 335, the generative AI model 310 may generate a schema relationship model. For example, the generative AI model 310 may generate the schema relationship model based on the identified one or more first relationships and in accordance with a reference schema relationship model. The schema relationship model may be an example of the entity relationship graph 255 as described with reference to FIG. 2. At 340, after generating the schema relationship model, the generative AI model 310 may output the schema relationship model.

At 345, the generative AI model 310 may obtain updated metadata. In some examples, the generative AI model 310 may obtain the updated metadata as part of a periodically executed job that is configured to update the schema relationship model. For example, at 350, the generative AI model 310 may update the schema relationship model. The periodically executed job may be an example of a cron job. The periodically executed job may occur at predefined intervals.

Updating the schema relationship model may include generating a second set of entity objects using the updated metadata received at 345 and based on the schema relationship model generated at 335. In other words, the generative AI model 310 may output the second set of entity objects based on an input of the augmented metadata, the schema relationship model (e.g., a previous iteration of the schema relationship model), and the reference schema. For example, the generative AI model 310 may update the augmented metadata (e.g., augment the updated metadata received at 345) and, based on the updated augmented metadata, generate new entity objects. In some examples, the second set of entity objects may replace the first set of entity objects, or the second set of entity objects may be an addition to entity objects associated with the hybrid datastore 305. For example, the second set of entity objects may include the first set of entity objects and one or more additional entity objects.

Additionally, or alternatively, updating the schema relationship model may include identifying one or more second relationships between two or more second entities. For example, the generative AI model 310 may identify the one or more second relationships using the second set of entity objects as inputs. The generative AI model 310 may update the schema relationship model based on the identified one or more second relationships and in accordance with the reference schema relationship model.

Figure 4:
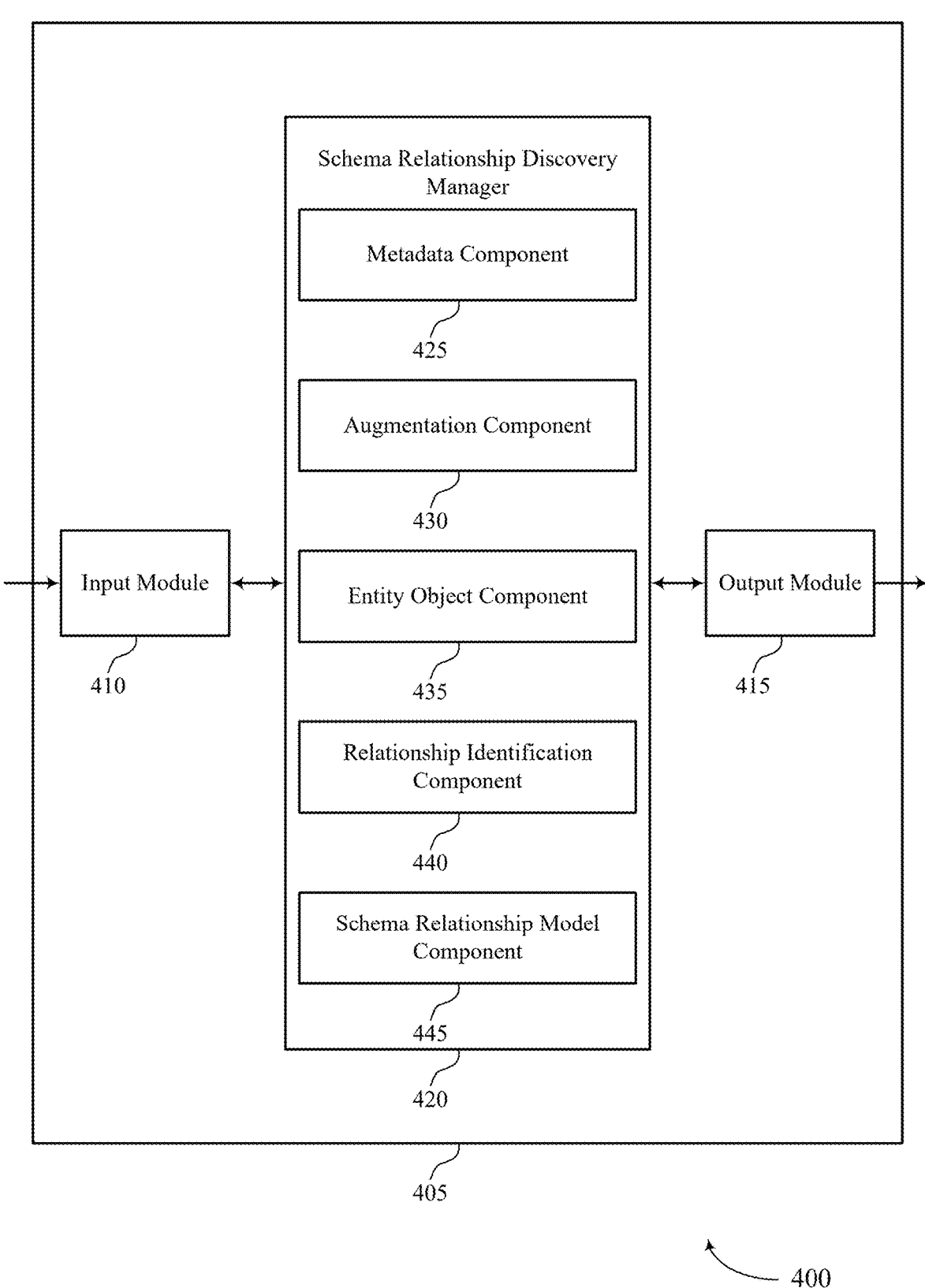
FIG. 4 shows a block diagram of an apparatus that supports schema relationship discovery in accordance with aspects of the present disclosure.

FIG. 4 shows a block diagram 400 of a device 405 that supports schema relationship discovery in accordance with aspects of the present disclosure. The device 405 may include an input module 410, an output module 415, and a schema relationship discovery manager 420. The device 405, or one or more components of the device 405 (e.g., the input module 410, the output module 415, the schema relationship discovery manager 420), may include at least one processor, which may be coupled with at least one memory, to support the described techniques. Each of these components may be in communication with one another (e.g., via one or more buses).

The input module 410 may manage input signals for the device 405. For example, the input module 410 may identify input signals based on an interaction with a modem, a keyboard, a mouse, a touchscreen, or a similar device. These input signals may be associated with user input or processing at other components or devices. In some cases, the input module 410 may utilize an operating system such as iOS®, ANDROID®, MS-DOS®, MS-WINDOWS®, OS/2®, UNIX®, LINUX®, or another known operating system to handle input signals. The input module 410 may send aspects of these input signals to other components of the device 405 for processing. For example, the input module 410 may transmit input signals to the schema relationship discovery manager 420 to support schema relationship discovery. In some cases, the input module 410 may be a component of an input/output (I/O) controller 610 as described with reference to FIG. 6.

The output module 415 may manage output signals for the device 405. For example, the output module 415 may receive signals from other components of the device 405, such as the schema relationship discovery manager 420, and may transmit these signals to other components or devices. In some examples, the output module 415 may transmit output signals for display in a user interface, for storage in a database or data store, for further processing at a server or server cluster, or for any other processes at any number of devices or systems. In some cases, the output module 415 may be a component of an I/O controller 610 as described with reference to FIG. 6.

For example, the schema relationship discovery manager 420 may include a metadata component 425, an augmentation component 430, an entity object component 435, a relationship identification component 440, a schema relationship model component 445, or any combination thereof. In some examples, the schema relationship discovery manager 420, or various components thereof, may be configured to perform various operations (e.g., receiving, monitoring, transmitting) using or otherwise in cooperation with the input module 410, the output module 415, or both. For example, the schema relationship discovery manager 420 may receive information from the input module 410, send information to the output module 415, or be integrated in combination with the input module 410, the output module 415, or both to receive information, transmit information, or perform various other operations as described herein.

The schema relationship discovery manager 420 may support generating a schema relationship model in accordance with examples as disclosed herein. The metadata component 425 may be configured to support obtaining a set of metadata associated with a set of multiple entities of a datastore, the set of multiple entities including at least two different data types. The augmentation component 430 may be configured to support augmenting, using a generative AI model, the set of metadata resulting in a set of augmented metadata for the set of multiple entities of the datastore. The entity object component 435 may be configured to support generating, using the set of augmented metadata, a first set of entity objects for the set of multiple entities of the datastore and in accordance with a reference schema. The relationship identification component 440 may be configured to support identifying, using the generative AI model and the first set of entity objects as inputs into the generative AI model, one or more first relationships between two or more first entities of the set of multiple entities of the datastore. The schema relationship model component 445 may be configured to support generating the schema relationship model based on the identified one or more first relationships and in accordance with a reference schema relationship model.

Figure 5:
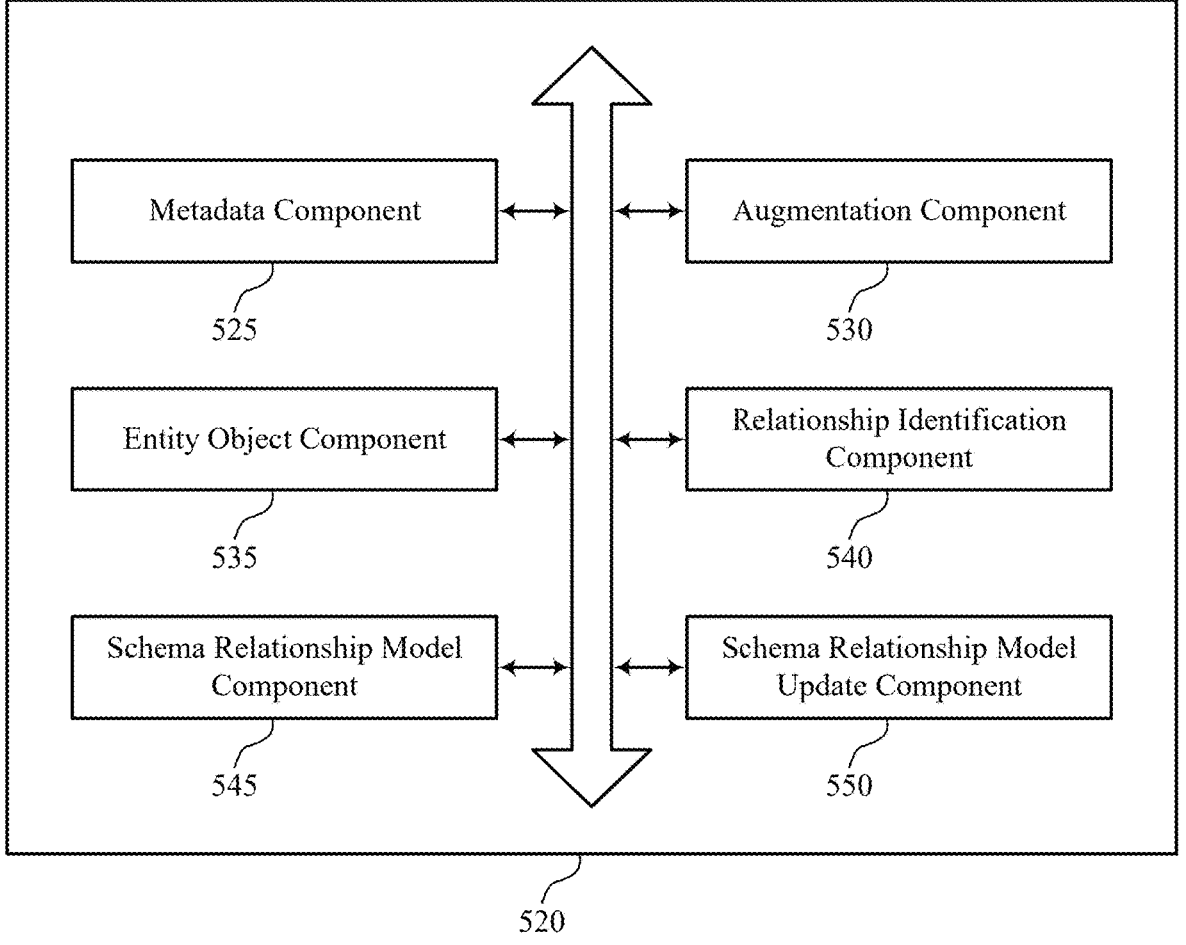
FIG. 5 shows a block diagram of a schema relationship discovery manager that supports schema relationship discovery in accordance with aspects of the present disclosure.

FIG. 5 shows a block diagram 500 of a schema relationship discovery manager 520 that supports schema relationship discovery in accordance with aspects of the present disclosure. The schema relationship discovery manager 520 may be an example of aspects of a schema relationship discovery manager or a schema relationship discovery manager 420, or both, as described herein. The schema relationship discovery manager 520, or various components thereof, may be an example of means for performing various aspects of schema relationship discovery as described herein. For example, the schema relationship discovery manager 520 may include a metadata component 525, an augmentation component 530, an entity object component 535, a relationship identification component 540, a schema relationship model component 545, a schema relationship model update component 550, or any combination thereof. Each of these components, or components of subcomponents thereof (e.g., one or more processors, one or more memories), may communicate, directly or indirectly, with one another (e.g., via one or more buses).

The schema relationship discovery manager 520 may support generating a schema relationship model in accordance with examples as disclosed herein. The metadata component 525 may be configured to support obtaining a set of metadata associated with a set of multiple entities of a datastore, the set of multiple entities including at least two different data types. The augmentation component 530 may be configured to support augmenting, using a generative AI model, the set of metadata resulting in a set of augmented metadata for the set of multiple entities of the datastore. The entity object component 535 may be configured to support generating, using the set of augmented metadata, a first set of entity objects for the set of multiple entities of the datastore and in accordance with a reference schema. The relationship identification component 540 may be configured to support identifying, using the generative AI model and the first set of entity objects as inputs into the generative AI model, one or more first relationships between two or more first entities of the set of multiple entities of the datastore. The schema relationship model component 545 may be configured to support generating the schema relationship model based on the identified one or more first relationships and in accordance with a reference schema relationship model.

In some examples, to support augmenting metadata for an entity of the set of multiple entities, the augmentation component 530 may be configured to support generating, using the metadata associated with the entity, data of the entity, or both as input into the generative AI model, augmented metadata for the entity, where the set of augmented metadata includes the augmented metadata for the entity.

In some examples, to support generating the augmented metadata for the entity, the augmentation component 530 may be configured to support generating information for one or more field descriptors, field identifiers, table descriptions, entity descriptions, or a combination thereof.

In some examples, to support identifying the one or more first relationships, the relationship identification component 540 may be configured to support identifying the one or more first relationships based on one or more second relationships between two or more second entities of the set of multiple entities of the datastore, where the one or more second relationships are identified prior to identifying the one or more first relationships.

In some examples, the schema relationship model update component 550 may be configured to support periodically executing a job that is configured to update the schema relationship model.

In some examples, metadata of the set of metadata for an entity of the set of multiple entities includes a table description of the entity, one or more field identifiers of the entity, one or more column identifiers of the entity, or any combination thereof.

In some examples, the datastore includes a hybrid datastore that includes a set of multiple different data types. In some examples, the one or more first relationships included a relationship between a first entity of a first data type and a second entity of a second data type.

In some examples, the entity object component 535 may be configured to support generating, using the set of augmented metadata and based on the schema relationship model, a second set of entity objects for the set of multiple entities of the datastore in accordance with the reference schema. In some examples, the relationship identification component 540 may be configured to support identifying, using the generative AI model and the second set of entity objects as inputs into the generative AI model, one or more second relationships between two or more second entities. In some examples, the schema relationship model update component 550 may be configured to support generating an updated schema relationship model based on the identified one or more second relationships and in accordance with the reference schema relationship model.

In some examples, to support generating the first set of entity objects, the entity object component 535 may be configured to support generating a respective JSON object for each entity of the set of multiple entities using the reference schema that is an empty JSON structure.

In some examples, the generative AI model includes a LLM.

In some examples, the set of multiple entities including the at least two different data types includes one or more SQL entities, one or more NoSQL entities, one or more documents, one or more BLOBs, one or more files, or any combination thereof.

Figure 6:
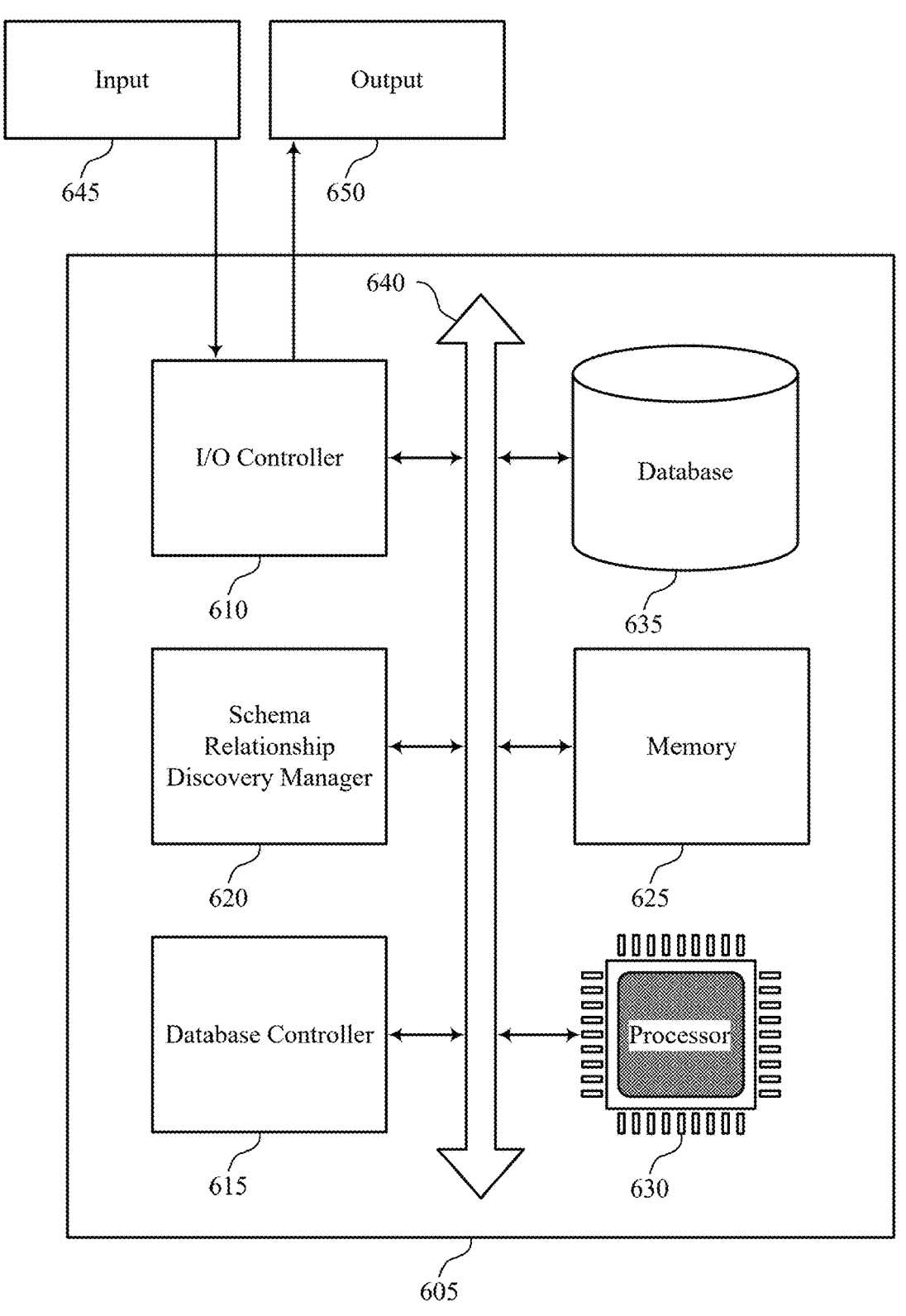
FIG. 6 shows a diagram of a system including a device that supports schema relationship discovery in accordance with aspects of the present disclosure.

FIG. 6 shows a diagram of a system 600 including a device 605 that supports schema relationship discovery in accordance with aspects of the present disclosure. The device 605 may be an example of or include components of a device 405 as described herein. The device 605 may include components for data processing and model execution or access, such as a schema relationship discovery manager 620, an I/O controller, such as an I/O controller 610, a database controller 615, at least one memory 625, at least one processor 630, and a database 635. These components may be in electronic communication or otherwise coupled (e.g., operatively, communicatively, functionally, electronically, electrically) via one or more buses (e.g., a bus 640).

The I/O controller 610 may manage input signals 645 and output signals 650 for the device 605. The I/O controller 610 may also manage peripherals not integrated into the device 605. In some cases, the I/O controller 610 may represent a physical connection or port to an external peripheral. In some cases, the I/O controller 610 may utilize an operating system such as iOS®, ANDROID®, MS-DOS®, MS-WINDOWS®, OS/2®, UNIX®, LINUX®, or another known operating system. In other cases, the I/O controller 610 may represent or interact with a modem, a keyboard, a mouse, a touchscreen, or a similar device. In some cases, the I/O controller 610 may be implemented as part of a processor 630. In some examples, a user may interact with the device 605 via the I/O controller 610 or via hardware components controlled by the I/O controller 610.

The database controller 615 may manage data storage and processing in a database 635. In some cases, a user may interact with the database controller 615. In other cases, the database controller 615 may operate automatically without user interaction. The database 635 may be an example of a single database, a distributed database, multiple distributed databases, a data store, a data lake, or an emergency backup database.

Memory 625 may include random-access memory (RAM) and read-only memory (ROM). The memory 625 may store computer-readable, computer-executable software including instructions that, when executed, cause at least one processor 630 to perform various functions described herein. In some cases, the memory 625 may contain, among other things, a basic I/O system (BIOS) which may control basic hardware or software operation such as the interaction with peripheral components or devices. The memory 625 may be an example of a single memory or multiple memories. For example, the device 605 may include one or more memories 625.

The processor 630 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 630 may be configured to operate a memory array using a memory controller. In other cases, a memory controller may be integrated into the processor 630. The processor 630 may be configured to execute computer-readable instructions stored in at least one memory 625 to perform various functions (e.g., functions or tasks supporting schema relationship discovery). The processor 630 may be an example of a single processor or multiple processors. For example, the device 605 may include one or more processors 630.

The schema relationship discovery manager 620 may support generating a schema relationship model in accordance with examples as disclosed herein. For example, the schema relationship discovery manager 620 may be configured to support obtaining a set of metadata associated with a set of multiple entities of a datastore, the set of multiple entities including at least two different data types. The schema relationship discovery manager 620 may be configured to support augmenting, using a generative AI model, the set of metadata resulting in a set of augmented metadata for the set of multiple entities of the datastore. The schema relationship discovery manager 620 may be configured to support generating, using the set of augmented metadata, a first set of entity objects for the set of multiple entities of the datastore and in accordance with a reference schema. The schema relationship discovery manager 620 may be configured to support identifying, using the generative AI model and the first set of entity objects as inputs into the generative AI model, one or more first relationships between two or more first entities of the set of multiple entities of the datastore. The schema relationship discovery manager 620 may be configured to support generating the schema relationship model based on the identified one or more first relationships and in accordance with a reference schema relationship model.

By including or configuring the schema relationship discovery manager 620 in accordance with examples as described herein, the device 605 may support techniques for improved identification of relationships between entities of a hybrid datastore.

FIG. 7 shows a flowchart illustrating a method 700 that supports schema relationship discovery in accordance with aspects of the present disclosure. The operations of the method 700 may be implemented by a Salesforce Device or its components as described herein. For example, the operations of the method 700 may be performed by a Salesforce Device as described with reference to FIGS. 1 through 6. In some examples, a Salesforce Device may execute a set of instructions to control the functional elements of the Salesforce Device to perform the described functions. Additionally, or alternatively, the Salesforce Device may perform aspects of the described functions using special-purpose hardware.

At 705, the method may include obtaining a set of metadata associated with a set of multiple entities of a datastore, the set of multiple entities including at least two different data types. The operations of 705 may be performed in accordance with examples as disclosed herein. In some examples, aspects of the operations of 705 may be performed by a metadata component 525 as described with reference to FIG. 5.

At 710, the method may include augmenting, using a generative AI model, the set of metadata resulting in a set of augmented metadata for the set of multiple entities of the datastore. The operations of 710 may be performed in accordance with examples as disclosed herein. In some examples, aspects of the operations of 710 may be performed by an augmentation component 530 as described with reference to FIG. 5.

At 715, the method may include generating, using the set of augmented metadata, a first set of entity objects for the set of multiple entities of the datastore and in accordance with a reference schema. The operations of 715 may be performed in accordance with examples as disclosed herein. In some examples, aspects of the operations of 715 may be performed by an entity object component 535 as described with reference to FIG. 5.

At 720, the method may include identifying, using the generative AI model and the first set of entity objects as inputs into the generative AI model, one or more first relationships between two or more first entities of the set of multiple entities of the datastore. The operations of 720 may be performed in accordance with examples as disclosed herein. In some examples, aspects of the operations of 720 may be performed by a relationship identification component 540 as described with reference to FIG. 5.

At 725, the method may include generating the schema relationship model based on the identified one or more first relationships and in accordance with a reference schema relationship model. The operations of 725 may be performed in accordance with examples as disclosed herein. In some examples, aspects of the operations of 725 may be performed by a schema relationship model component 545 as described with reference to FIG. 5.

FIG. 8 shows a flowchart illustrating a method 800 that supports schema relationship discovery in accordance with aspects of the present disclosure. The operations of the method 800 may be implemented by a Salesforce Device or its components as described herein. For example, the operations of the method 800 may be performed by a Salesforce Device as described with reference to FIGS. 1 through 6. In some examples, a Salesforce Device may execute a set of instructions to control the functional elements of the Salesforce Device to perform the described functions. Additionally, or alternatively, the Salesforce Device may perform aspects of the described functions using special-purpose hardware.

At 805, the method may include obtaining a set of metadata associated with a set of multiple entities of a datastore, the set of multiple entities including at least two different data types. The operations of 805 may be performed in accordance with examples as disclosed herein. In some examples, aspects of the operations of 805 may be performed by a metadata component 525 as described with reference to FIG. 5.

At 810, the method may include augmenting, using a generative AI model, the set of metadata resulting in a set of augmented metadata for the set of multiple entities of the datastore. The operations of 810 may be performed in accordance with examples as disclosed herein. In some examples, aspects of the operations of 810 may be performed by an augmentation component 530 as described with reference to FIG. 5.

The augmenting, at 815, may include generating, using the metadata associated with the entity, data of the entity, or both as input into the generative AI model, augmented metadata for the entity, where the set of augmented metadata includes the augmented metadata for the entity. The operations of 815 may be performed in accordance with examples as disclosed herein. In some examples, aspects of the operations of 815 may be performed by an augmentation component 530 as described with reference to FIG. 5.

At 820, the method may include generating, using the set of augmented metadata, a first set of entity objects for the set of multiple entities of the datastore and in accordance with a reference schema. The operations of 820 may be performed in accordance with examples as disclosed herein. In some examples, aspects of the operations of 820 may be performed by an entity object component 535 as described with reference to FIG. 5.

At 825, the method may include identifying, using the generative AI model and the first set of entity objects as inputs into the generative AI model, one or more first relationships between two or more first entities of the set of multiple entities of the datastore. The operations of 825 may be performed in accordance with examples as disclosed herein. In some examples, aspects of the operations of 825 may be performed by a relationship identification component 540 as described with reference to FIG. 5.

At 830, the method may include generating the schema relationship model based on the identified one or more first relationships and in accordance with a reference schema relationship model. The operations of 830 may be performed in accordance with examples as disclosed herein. In some examples, aspects of the operations of 830 may be performed by a schema relationship model component 545 as described with reference to FIG. 5.

A method for generating a schema relationship model by an apparatus is described. The method may include obtaining a set of metadata associated with a set of multiple entities of a datastore, the set of multiple entities including at least two different data types, augmenting, using a generative AI model, the set of metadata resulting in a set of augmented metadata for the set of multiple entities of the datastore, generating, using the set of augmented metadata, a first set of entity objects for the set of multiple entities of the datastore and in accordance with a reference schema, identifying, using the generative AI model and the first set of entity objects as inputs into the generative AI model, one or more first relationships between two or more first entities of the set of multiple entities of the datastore, and generating the schema relationship model based on the identified one or more first relationships and in accordance with a reference schema relationship model.

An apparatus for generating a schema relationship model is described. The apparatus may include one or more memories storing processor executable code, and one or more processors coupled with the one or more memories. The one or more processors may individually or collectively be operable to execute the code to cause the apparatus to obtain a set of metadata associated with a set of multiple entities of a datastore, the set of multiple entities including at least two different data types, augment, using a generative AI model, the set of metadata resulting in a set of augmented metadata for the set of multiple entities of the datastore, generate, using the set of augmented metadata, a first set of entity objects for the set of multiple entities of the datastore and in accordance with a reference schema, identify, using the generative AI model and the first set of entity objects as inputs into the generative AI model, one or more first relationships between two or more first entities of the set of multiple entities of the datastore, and generate the schema relationship model based on the identified one or more first relationships and in accordance with a reference schema relationship model.

Another apparatus for generating a schema relationship model is described. The apparatus may include means for obtaining a set of metadata associated with a set of multiple entities of a datastore, the set of multiple entities including at least two different data types, means for augmenting, using a generative AI model, the set of metadata resulting in a set of augmented metadata for the set of multiple entities of the datastore, means for generating, using the set of augmented metadata, a first set of entity objects for the set of multiple entities of the datastore and in accordance with a reference schema, means for identifying, using the generative AI model and the first set of entity objects as inputs into the generative AI model, one or more first relationships between two or more first entities of the set of multiple entities of the datastore, and means for generating the schema relationship model based on the identified one or more first relationships and in accordance with a reference schema relationship model.

A non-transitory computer-readable medium storing code for generating a schema relationship model is described. The code may include instructions executable by one or more processors to obtain a set of metadata associated with a set of multiple entities of a datastore, the set of multiple entities including at least two different data types, augment, using a generative AI model, the set of metadata resulting in a set of augmented metadata for the set of multiple entities of the datastore, generate, using the set of augmented metadata, a first set of entity objects for the set of multiple entities of the datastore and in accordance with a reference schema, identify, using the generative AI model and the first set of entity objects as inputs into the generative AI model, one or more first relationships between two or more first entities of the set of multiple entities of the datastore, and generate the schema relationship model based on the identified one or more first relationships and in accordance with a reference schema relationship model.

In some examples of the method, apparatus, and non-transitory computer-readable medium described herein, augmenting metadata for an entity of the set of multiple entities may include operations, features, means, or instructions for generating, using the metadata associated with the entity, data of the entity, or both as input into the generative AI model, augmented metadata for the entity, where the set of augmented metadata includes the augmented metadata for the entity.

In some examples of the method, apparatus, and non-transitory computer-readable medium described herein, generating the augmented metadata for the entity may include operations, features, means, or instructions for generating information for one or more field descriptors, field identifiers, table descriptions, entity descriptions, or a combination thereof.

In some examples of the method, apparatus, and non-transitory computer-readable medium described herein, identifying the one or more first relationships may include operations, features, means, or instructions for identifying the one or more first relationships based on one or more second relationships between two or more second entities of the set of multiple entities of the datastore, where the one or more second relationships may be identified prior to identifying the one or more first relationships.

In some examples of the method, apparatus, and non-transitory computer-readable medium described herein, periodically executing a job that may be configured to update the schema relationship model.

In some examples of the method, apparatus, and non-transitory computer-readable medium described herein, metadata of the set of metadata for an entity of the set of multiple entities includes a table description of the entity, one or more field identifiers of the entity, one or more column identifiers of the entity, or any combination thereof.

In some examples of the method, apparatus, and non-transitory computer-readable medium described herein, the datastore includes a hybrid datastore that includes a set of multiple different data types and the one or more first relationships included a relationship between a first entity of a first data type and a second entity of a second data type.

Some examples of the method, apparatus, and non-transitory computer-readable medium described herein may further include operations, features, means, or instructions for generating, using the set of augmented metadata and based on the schema relationship model, a second set of entity objects for the set of multiple entities of the datastore in accordance with the reference schema, identifying, using the generative AI model and the second set of entity objects as inputs into the generative AI model, one or more second relationships between two or more second entities, and generating an updated schema relationship model based on the identified one or more second relationships and in accordance with the reference schema relationship model.

In some examples of the method, apparatus, and non-transitory computer-readable medium described herein, generating the first set of entity objects may include operations, features, means, or instructions for generating a respective JSON object for each entity of the set of multiple entities using the reference schema that may be an empty JSON structure.

In some examples of the method, apparatus, and non-transitory computer-readable medium described herein, the generative AI model includes an LLM.

In some examples of the method, apparatus, and non-transitory computer-readable medium described herein, the set of multiple entities including the at least two different data types includes one or more SQL entities, one or more NoSQL entities, one or more documents, one or more BLOBs, one or more files, or any combination thereof.

The following provides an overview of aspects of the present disclosure:

Aspect 1: A method for generating a schema relationship model, comprising: obtaining a set of metadata associated with a plurality of entities of a datastore, the plurality of entities comprising at least two different data types; augmenting, using a generative AI model, the set of metadata resulting in a set of augmented metadata for the plurality of entities of the datastore; generating, using the set of augmented metadata, a first set of entity objects for the plurality of entities of the datastore and in accordance with a reference schema; identifying, using the generative AI model and the first set of entity objects as inputs into the generative AI model, one or more first relationships between two or more first entities of the plurality of entities of the datastore; and generating the schema relationship model based at least in part on the identified one or more first relationships and in accordance with a reference schema relationship model.

Aspect 2: The method of aspect 1, wherein augmenting metadata for an entity of the plurality of entities comprises: generating, using the metadata associated with the entity, data of the entity, or both as input into the generative AI model, augmented metadata for the entity, wherein the set of augmented metadata comprises the augmented metadata for the entity.

Aspect 3: The method of aspect 2, wherein generating the augmented metadata for the entity comprises: generating information for one or more field descriptors, field identifiers, table descriptions, entity descriptions, or a combination thereof.

Aspect 4: The method of any of aspects 1 through 3, wherein identifying the one or more first relationships comprises: identifying the one or more first relationships based at least in part on one or more second relationships between two or more second entities of the plurality of entities of the datastore, wherein the one or more second relationships are identified prior to identifying the one or more first relationships.

Aspect 5: The method of any of aspects 1 through 4, further comprising: periodically executing a job that is configured to update the schema relationship model.

Aspect 6: The method of any of aspects 1 through 5, wherein metadata of the set of metadata for an entity of the plurality of entities comprises a table description of the entity, one or more field identifiers of the entity, one or more column identifiers of the entity, or any combination thereof.

Aspect 7: The method of any of aspects 1 through 6, wherein the datastore comprises a hybrid datastore that comprises a plurality of different data types, and the one or more first relationships comprised a relationship between a first entity of a first data type and a second entity of a second data type.

Aspect 8: The method of any of aspects 1 through 7, further comprising: generating, using the set of augmented metadata and based at least in part on the schema relationship model, a second set of entity objects for the plurality of entities of the datastore in accordance with the reference schema; identifying, using the generative AI model and the second set of entity objects as inputs into the generative AI model, one or more second relationships between two or more second entities; and generating an updated schema relationship model based at least in part on the identified one or more second relationships and in accordance with the reference schema relationship model.

Aspect 9: The method of any of aspects 1 through 8, wherein generating the first set of entity objects comprises: generating a respective JSON object for each entity of the plurality of entities using the reference schema that is an empty JSON structure.

Aspect 10: The method of any of aspects 1 through 9, wherein the generative AI model comprises a LLM.

Aspect 11: The method of any of aspects 1 through 10, wherein the plurality of entities comprising the at least two different data types comprises one or more SQL entities, one or more NoSQL entities, one or more documents, one or more BLOBs, one or more files, or any combination thereof.

Aspect 12: An apparatus for generating a schema relationship model, comprising one or more memories storing processor-executable code, and one or more processors coupled with the one or more memories and individually or collectively operable to execute the code to cause the apparatus to perform a method of any of aspects 1 through 11.

Aspect 13: An apparatus for generating a schema relationship model, comprising at least one means for performing a method of any of aspects 1 through 11.

Aspect 14: A non-transitory computer-readable medium storing code for generating a schema relationship model, the code comprising instructions executable by one or more processors to perform a method of any of aspects 1 through 11.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for generating a schema relationship model, comprising:

obtaining a set of metadata associated with a plurality of entities of a datastore, the plurality of entities comprising at least two different data types;

augmenting, using a generative artificial intelligence (AI) model, the set of metadata resulting in a set of augmented metadata for the plurality of entities of the datastore;

generating, using the set of augmented metadata, a first set of entity objects for the plurality of entities of the datastore and in accordance with a reference schema, wherein generating the first set of entity objects transforms the set of metadata associated with the plurality of entities to a common format associated with the reference schema;

identifying, using the generative AI model and the first set of entity objects as inputs into the generative AI model and based at least in part on transforming the set of metadata to the common format, one or more first relationships between two or more first entities of the plurality of entities of the datastore, wherein a first entity of the two or more first entities has a first data type of a set of data types and a second entity of the two or more first entities has a second data type of the set of data types that is different than the first data type, the set of data types comprising two or more of a structured query language (SQL) data type, a not only SQL (NoSQL) data type, a document data type, a binary large object (BLOB) data type, or a file data type; and generating the schema relationship model based at least in part on the identified one or more first relationships and in accordance with a reference schema relationship model.

2. The method of claim 1, wherein augmenting metadata for an entity of the plurality of entities comprises:

generating, using the metadata associated with the entity, data of the entity, or both as input into the generative AI model, augmented metadata for the entity, wherein the set of augmented metadata comprises the augmented metadata for the entity.

3. The method of claim 2, wherein generating the augmented metadata for the entity comprises:

generating information for one or more field descriptors, field identifiers, table descriptions, entity descriptions, or a combination thereof.

4. The method of claim 1, wherein identifying the one or more first relationships comprises:

identifying the one or more first relationships based at least in part on one or more second relationships between two or more second entities of the plurality of entities of the datastore, wherein the one or more second relationships are identified prior to identifying the one or more first relationships.

5. The method of claim 1, further comprising:

periodically executing a job that is configured to update the schema relationship model.

6. The method of claim 1, wherein metadata of the set of metadata for an entity of the plurality of entities comprises a table description of the entity, one or more field identifiers of the entity, one or more column identifiers of the entity, or any combination thereof.

7. The method of claim 1, wherein:

the datastore comprises a hybrid datastore that comprises a plurality of different data types.

8. The method of claim 1, further comprising:

generating, using the set of augmented metadata and based at least in part on the schema relationship model, a second set of entity objects for the plurality of entities of the datastore in accordance with the reference schema;

identifying, using the generative AI model and the second set of entity objects as inputs into the generative AI model, one or more second relationships between two or more second entities; and generating an updated schema relationship model based at least in part on the identified one or more second relationships and in accordance with the reference schema relationship model.

9. The method of claim 1, wherein generating the first set of entity objects comprises:

generating a respective JavaScript Object Notation (JSON) object for each entity of the plurality of entities using the reference schema that is an empty JSON structure.

10. The method of claim 1, wherein the generative AI model comprises a large language model (LLM).

11. The method of claim 1, wherein the plurality of entities comprising the at least two different data types comprises one or more structured query language (SQL) entities, one or more not only SQL (NoSQL) entities, one or more documents, one or more binary large objects (BLOBs), one or more files, or any combination thereof.

12. An apparatus for generating a schema relationship model, comprising:

one or more memories storing processor-executable code; and one or more processors coupled with the one or more memories and individually or collectively operable to execute the code to cause the apparatus to:

obtain a set of metadata associated with a plurality of entities of a datastore, the plurality of entities comprising at least two different data types;

augment, using a generative artificial intelligence (AI) model, the set of metadata resulting in a set of augmented metadata for the plurality of entities of the datastore;

generate, using the set of augmented metadata, a first set of entity objects for the plurality of entities of the datastore and in accordance with a reference schema, wherein generation of the first set of entity objects transforms the set of metadata associated with the plurality of entities to a common format associated with the reference schema;

identify, using the generative AI model and the first set of entity objects as inputs into the generative AI model and based at least in part on transforming the set of metadata to the common format, one or more first relationships between two or more first entities of the plurality of entities of the datastore, wherein a first entity of the two or more first entities has a first data type of a set of data types and a second entity of the two or more first entities has a second data type of the set of data types that is different than the first data type, the set of data types comprising two or more of a structured query language (SQL) data type, a not only SQL (NoSQL) data type, a document data type, a binary large object (BLOB) data type, or a file data type; and generate the schema relationship model based at least in part on the identified one or more first relationships and in accordance with a reference schema relationship model.

13. The apparatus of claim 12, wherein, to augment metadata for an entity of the plurality of entities, the one or more processors are individually or collectively operable to execute the code to cause the apparatus to:

generate, using the metadata associated with the entity, data of the entity, or both as input into the generative AI model, augmented metadata for the entity, wherein the set of augmented metadata comprises the augmented metadata for the entity.

14. The apparatus of claim 13, wherein, to generate the augmented metadata for the entity, the one or more processors are individually or collectively operable to execute the code to cause the apparatus to:

generate information for one or more field descriptors, field identifiers, table descriptions, entity descriptions, or a combination thereof.

15. The apparatus of claim 12, wherein, to identify the one or more first relationships, the one or more processors are individually or collectively operable to execute the code to cause the apparatus to:

identify the one or more first relationships based at least in part on one or more second relationships between two or more second entities of the plurality of entities of the datastore, wherein the one or more second relationships are identified prior to identifying the one or more first relationships.

16. The apparatus of claim 12, wherein the one or more processors are individually or collectively further operable to execute the code to cause the apparatus to:

periodically execute a job that is configured to update the schema relationship model.

17. The apparatus of claim 12, wherein metadata of the set of metadata for an entity of the plurality of entities comprises a table description of the entity, one or more field identifiers of the entity, one or more column identifiers of the entity, or any combination thereof.

18. The apparatus of claim 12, wherein:

the datastore comprises a hybrid datastore that comprises a plurality of different data types.

19. The apparatus of claim 12, wherein the one or more processors are individually or collectively further operable to execute the code to cause the apparatus to:

generate, using the set of augmented metadata and based at least in part on the schema relationship model, a second set of entity objects for the plurality of entities of the datastore in accordance with the reference schema;

identify, using the generative AI model and the second set of entity objects as inputs into the generative AI model, one or more second relationships between two or more second entities; and generate an updated schema relationship model based at least in part on the identified one or more second relationships and in accordance with the reference schema relationship model.

20. A non-transitory computer-readable medium storing code for generating a schema relationship model, the code comprising instructions executable by one or more processors to:

obtain a set of metadata associated with a plurality of entities of a datastore, the plurality of entities comprising at least two different data types;

augment, using a generative artificial intelligence (AI) model, the set of metadata resulting in a set of augmented metadata for the plurality of entities of the datastore;

generate, using the set of augmented metadata, a first set of entity objects for the plurality of entities of the datastore and in accordance with a reference schema, wherein generation of the first set of entity objects transforms the set of metadata associated with the plurality of entities to a common format associated with the reference schema;

identify, using the generative AI model and the first set of entity objects as inputs into the generative AI model and based at least in part on transforming the set of metadata to the common format, one or more first relationships between two or more first entities of the plurality of entities of the datastore, wherein a first entity of the two or more first entities has a first data type of a set of data types and a second entity of the two or more first entities has a second data type of the set of data types that is different than the first data type, the set of data types comprising two or more of a structured query language (SQL) data type, a not only SQL (NoSQL) data type, a document data type, a binary large object (BLOB) data type, or a file data type; and generate the schema relationship model based at least in part on the identified one or more first relationships and in accordance with a reference schema relationship model.

* * * * *